US008656506B2

(12) United States Patent
Alkove et al.

(10) Patent No.: US 8,656,506 B2
(45) Date of Patent: Feb. 18, 2014

(54) RIGHTS ENFORCEMENT OF UNENCRYPTED CONTENT

(75) Inventors: James M. Alkove, Woodinville, WA (US); Chadd B. Knowlton, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1451 days.

(21) Appl. No.: 11/823,595

(22) Filed: Jun. 28, 2007

(65) Prior Publication Data

US 2009/0007279 A1    Jan. 1, 2009

(51) Int. Cl.
    *H04L 29/06*    (2006.01)

(52) U.S. Cl.
    USPC .................................. 726/28; 726/26; 726/27

(58) Field of Classification Search
    USPC ................................................ 726/26, 27, 28
    See application file for complete search history.

(56) References Cited

U.S. PATENT DOCUMENTS

| | | | |
|---|---|---|---|
| 6,477,649 B2 * | 11/2002 | Kambayashi et al. | 726/27 |
| 6,801,999 B1 | 10/2004 | Venkatesan et al. | |
| 7,111,169 B2 * | 9/2006 | Ripley et al. | 713/176 |
| 7,130,829 B2 | 10/2006 | Banerjee et al. | |
| 7,146,560 B2 | 12/2006 | Dang et al. | |
| 7,433,930 B2 * | 10/2008 | Fenizia et al. | 709/217 |
| 7,689,304 B2 * | 3/2010 | Sasaki | 700/94 |
| 7,739,723 B2 * | 6/2010 | Rogers et al. | 726/2 |
| 2002/0069283 A1 * | 6/2002 | Lee | 709/227 |
| 2002/0169953 A1 * | 11/2002 | Moharram et al. | 713/151 |
| 2002/0178361 A1 * | 11/2002 | Genty et al. | 713/175 |
| 2003/0012384 A1 * | 1/2003 | Vicard et al. | 380/277 |
| 2004/0073803 A1 | 4/2004 | Keramane | |
| 2004/0117197 A1 * | 6/2004 | Dutta et al. | 705/1 |
| 2004/0133797 A1 | 7/2004 | Arnold | |
| 2004/0197084 A1 * | 10/2004 | Tagawa et al. | 386/95 |
| 2005/0288939 A1 | 12/2005 | Peled et al. | |
| 2006/0053079 A1 | 3/2006 | Edmonson et al. | |
| 2006/0062426 A1 | 3/2006 | Levy et al. | |
| 2006/0190409 A1 * | 8/2006 | Hillegass et al. | 705/59 |
| 2006/0195789 A1 * | 8/2006 | Rogers et al. | 715/727 |
| 2007/0229678 A1 * | 10/2007 | Barrus et al. | 348/231.3 |
| 2007/0234215 A1 * | 10/2007 | Graham et al. | 715/723 |
| 2009/0007198 A1 * | 1/2009 | Lavender et al. | 725/91 |
| 2009/0106258 A1 * | 4/2009 | Fenizia et al. | 707/10 |

OTHER PUBLICATIONS

"Digital Watermarking Alliance", p. 1-33.

(Continued)

*Primary Examiner* — Bradley Holder
(74) *Attorney, Agent, or Firm* — Micah Goldsmith; Glen Johnson; Micky Minhas

(57) ABSTRACT

In accordance with one or more aspects of the rights enforcement of unencrypted content, a nameplate associated with unencrypted content is generated. The nameplate includes an identifier of the unencrypted content and an identifier of an authorized user of the unencrypted content. The nameplate is sent to a device of the authorized user for rights enforcement of the unencrypted content on the device. In accordance with one or more other aspects of the rights enforcement of unencrypted content, a nameplate for unencrypted content to be played back on a device is obtained. The nameplate includes an identifier of the unencrypted content and an identifier of an authorized user of the unencrypted content. The device presents, during playback of the unencrypted content on the device, the identifier of the authorized user of the unencrypted content.

12 Claims, 7 Drawing Sheets

(56) References Cited

OTHER PUBLICATIONS

Cheung, et al., "Rights Protection for Digital Contents Redistribution over the Internet", Date: 2002, pp. 1-6, Proceedings, 26th Annual International Computer Software and Applications Conference, 2002.

Deng, "Personal Rights Management—Taming Camera-Phones for Individual Privacy Enforcement", p. 1-18.

H. Yu, "Digital Multimedia at Home and Content Rights Management", Date: 2002, pp. 49-56, Proceedings of the IEEE 4th International Workshop on Networked Appliances, 2002. Gaithersburg.

* cited by examiner

RIGHTS ENFORCEMENT OF UNENCRYPTED CONTENT

BACKGROUND

As computing technology has advanced and the Internet has grown to allow many different devices to communicate with one another, the transfer of content among devices has grown dramatically. Many different types of content can be transferred, but the transfer of audio and audio/video content, such as songs and movies or television programs, has become increasingly commonplace. In many situations, content is encrypted in order to allow the content owner (e.g., the owner of the copyright in the content) to control how the content is used. Such encryption, however, can create obstacles to using the content for authorized users of the content, such as those that have purchased a license to use the content.

One recent trend is for content owners to distribute their content in unencrypted form. This allows the obstacles placed in the way of legitimate users of encrypted content to be avoided. However, this also leaves the copyright owner open to the possibility of the content being used by unauthorized users. This can be problematic for the content owner because in many cases the content owner's primary business model is charging each unique user for access to the content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the rights enforcement of unencrypted content discussed herein, a nameplate associated with unencrypted content is generated. The nameplate includes an identifier of the unencrypted content and an identifier of an authorized user of the unencrypted content. The nameplate is sent to a device of the authorized user for rights enforcement of the unencrypted content on the device.

In accordance with one or more aspects of the rights enforcement of unencrypted content discussed herein, a nameplate for unencrypted content to be played back on a device is obtained. The nameplate includes an identifier of the unencrypted content and an identifier of an authorized user of the unencrypted content. The device presents, during playback of the unencrypted content on the device, the identifier of the authorized user of the unencrypted content.

BRIEF DESCRIPTION OF THE DRAWINGS

The same numbers are used throughout the drawings to reference like features.

DETAILED DESCRIPTION

Rights enforcement of unencrypted content is discussed herein. A nameplate is associated with unencrypted content. The nameplate includes an identifier of the unencrypted content and an identifier of an authorized user of the unencrypted content. The authorized user is, for example, a user that has purchased a license to use the content. When the unencrypted content is played back, the identifier of the authorized user is presented on the playback device. Additionally, if the user of the playback device is not the authorized user of the unencrypted content, then the user can select some action, such as purchasing a license to use the content.

Figure 1:
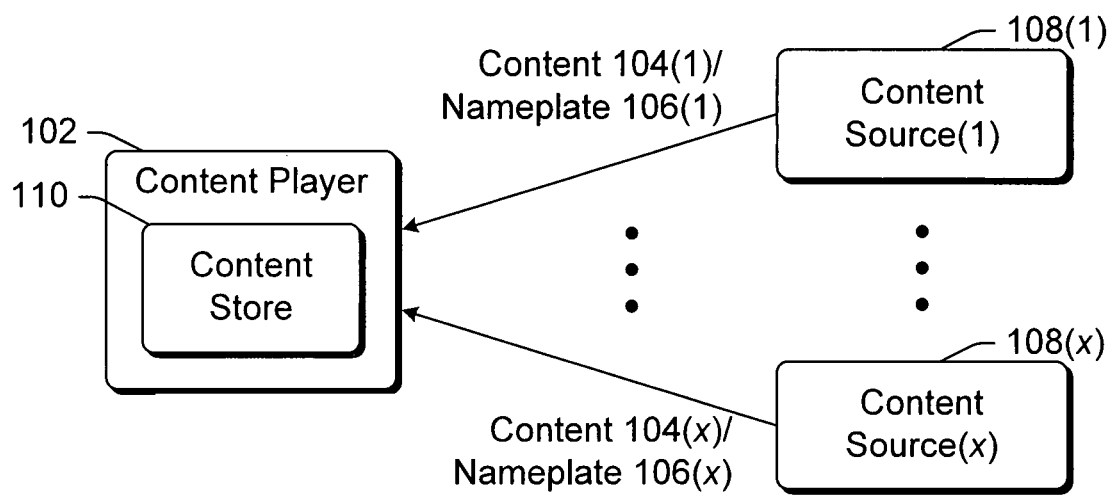
FIG. 1 illustrates an example system in which the rights enforcement of unencrypted content can be implemented.

FIG. 1 illustrates an example system 100 in which the rights enforcement of unencrypted content can be implemented. Content player 102 obtains content 104(1), . . . , 104(x) and/or nameplates 106(1), . . . , 106(x) from one of multiple (x) content sources 108(1), . . . , 108(x). Content 104 refers to any of a variety of different types of content that can be played back to a user, and typically is audio content or audio/video content. For example, content may be an entire song, multiple songs, a portion(s) of a song, an entire image, multiple images, a portion(s) of an image, an entire movie, multiple movies, a portion(s) of a movie, and so forth. Each nameplate 106 identifies particular content as well as an authorized user of that particular content. Nameplates 106 are discussed in additional detail below.

Content player 102 can be any of a variety of types of devices capable of playing back content 104. Examples of content players 102 include portable music players, portable movie players, cellular phones, desktop computers, handheld computers or personal digital assistants (PDAs), vehicle (e.g., automobile) computers, game consoles, and so forth.

Content player 102 can obtain content 104 and/or nameplates 106 from any of a variety of different content sources 108. Examples of content sources 108 include server computers, local desktop or laptop computers, other content players 102, and so forth. The manner in which content player 102 obtains content 104 and/or nameplates 106 can vary by implementation and based on the nature of the content source 108, such as accessing source 108 via a wired or wireless connection (e.g., a Universal Serial Bus (USB) cable, a Bluetooth connection, a radio frequency (RF) connection, etc.), over a public and/or proprietary network such as the Internet or a local area network (LAN), and so forth.

Content player 102 includes a content store 110 that stores content 104 once it is obtained by content player 102. Nameplates 106 can optionally be stored in content store 110 as well, or alternatively can be stored separately as discussed in more detail below. Content store 110 can be implemented using any of a variety of storage media, such as one or more of random access memory (RAM), Flash memory, optical disk, magnetic disk, and so forth.

The discussions herein include reference to digital signatures and public/private key pairs. Digital signatures are based on public key cryptography, which is well-known to those skilled in the art. Nonetheless, a brief overview of digital signatures and public key cryptography is included here to assist the reader. In public key cryptography, an entity (such as a hardware or software component, a device, a user, etc.) has associated with it a public/private key pair. The public key can be made publicly available, but the entity keeps the private key a secret. Without the private key it is computationally very difficult to decrypt data that is encrypted using the public key, and without the public key it is computationally very difficult to decrypt data that is encrypted using the private key. So, an entity A can generate a digital signature for data by encrypting a hash of the data with the private key of entity A, and then make the data as well as the digital signature available to other entities. Any other entity can decrypt the encrypted hash using the public key of entity A and compare the decrypted hash to a hash of data made available by entity A; if the comparison indicates that the decrypted hash of the data and the hash of the data made available by entity A are the same then the entity can be assured that no one has tampered with or altered the data that was digitally signed by entity A.

Figure 2:
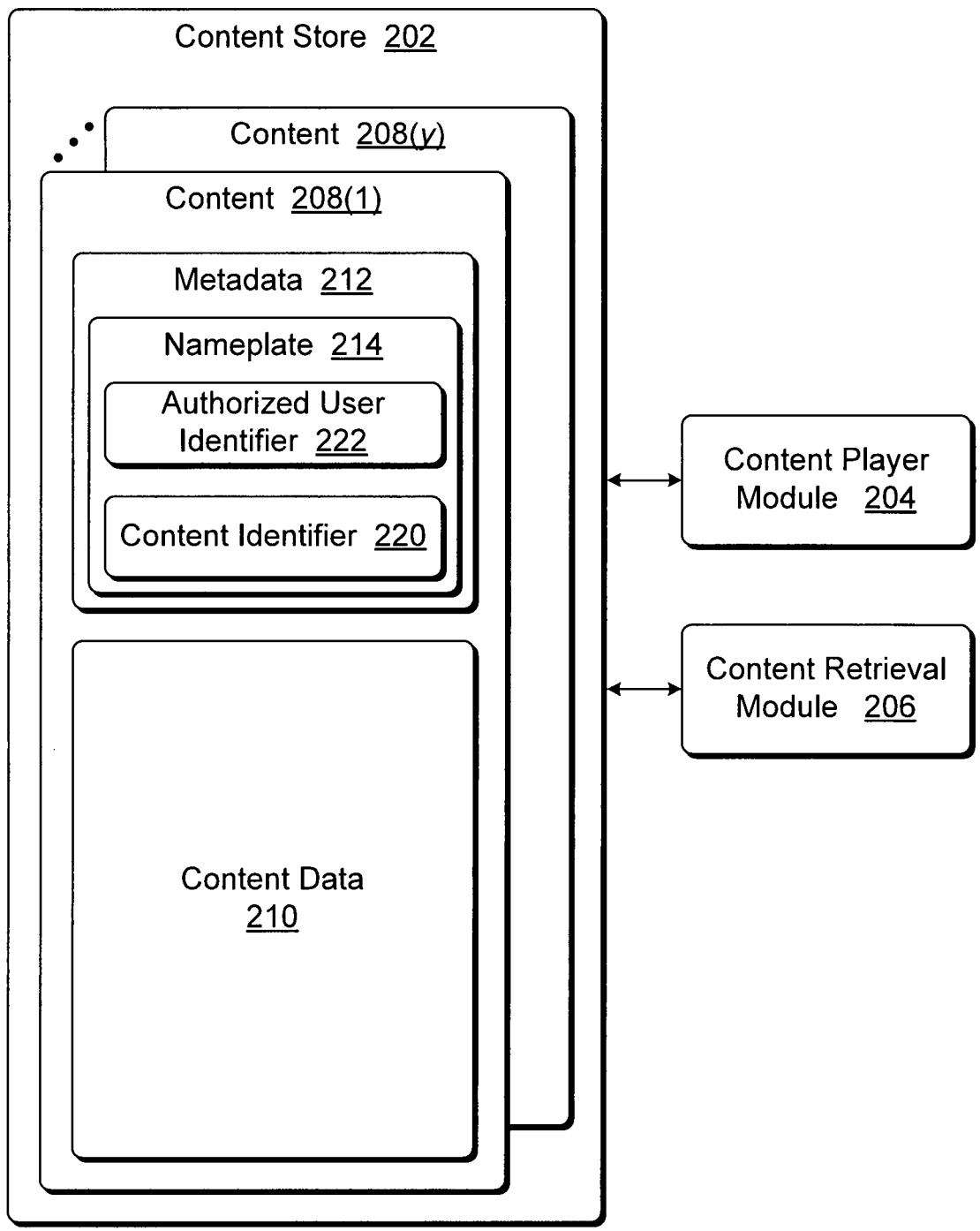
FIG. 2 illustrates an example content player.

FIG. 2 illustrates an example content player 200. Content player 200 can be, for example, content player 102 of FIG. 1. Content player 200 includes a content store 202, a content player module 204, and a content retrieval module 206. Content player 200 can obtain content and nameplates from various content sources as discussed above with reference to FIG. 1.

Content store 202 includes different content 208(1), ..., 208(y), each of which includes different content data 210 and different metadata 212. Content data 210 refers to the data that is played by content player module 204 in order to play back content 208. For example, for audio content, content data 210 is the audio data in any of variety of formats, such as Windows Media Audio (WMA), MP3, and so forth. Content data 210 is unencrypted content, so it can be freely copied from content store 202 to other content players or storage devices. Content store 202 is typically part of content player 200 as illustrated, although content store 202 can alternatively be separate from content player 200. For example, content store 202 can be implemented on a removable storage device (e.g., a removable Flash memory card or removable magnetic disk drive), or can be implemented on a remote storage device (e.g., a network storage device that is accessible to content player 200).

Metadata 212 includes various information describing content 208, such as a title (e.g., movie name, song name, etc.), name(s) of the artist(s) or actor(s), album name, cover art, and so forth. Any of a variety of different data describing content 208 can be included in metadata 212, and the particular data can vary by implementation and by type of content.

Additionally, metadata 212 includes nameplate 214. Nameplate 214 includes a content identifier 220 and an authorized user identifier 222. Content identifier 220 identifies content 208. Content identifier 220 should uniquely identify content 208, or at least identify content 208 with a low probability of different content 208 having the same content identifier 220. In one or more embodiments, content identifier 220 is a hash value generated by applying a hash function to content data 210 and/or metadata 212 (at least some of the metadata 212, except for nameplate 214). Alternatively, other techniques can be used. In one or more other embodiments, a content distributor or a central authority assigns an identifier to content 208. In such embodiments, the content distributor or other authority that assigns the identifiers to content keeps track of the identifiers assigned so that different content is not assigned the same identifier.

Authorized user identifier 222 identifies the particular user that is authorized to use content 208. The user that is authorized to use content 208 is the user that has satisfied the requirements of the content distributor or content source in order to become an authorized user. Different content distributors, and different content, can have different requirements. Typically this requirement is a fee that is paid by the user, although different requirements could alternatively be used.

The identifier of the user is typically a name of the user, which may be the user's given name or alternatively a user name or user id assigned by a device or service. For example, a user may register with a content source to obtain content from that source, and a user id or user name is assigned to the user by that content source. This user id or user name can then be used as authorized user identifier 222. By way of another example, a user may have a user id or user name that he or she logs into content player 200 with, and this user id or user name can be used as authorized user identifier 222.

In one or more embodiments, authorized user identifier 222 identifies a particular domain rather than an individual user. A domain is associated with a particular user or group of users, and can include multiple devices. Different devices of that particular user or group of users can have different ones of their devices join the domain. For example, a user can have his or her desktop computer, portable music player, cellular phone, and automotive computer all part of his or her domain. Any of the user's devices that are part of the user's domain are thus considered authorized users of the content.

Nameplate 214 is also digitally signed. Nameplate 214 is typically digitally signed by the content source 108 of FIG. 1 from which content player 200 obtains content 208. Alternatively, some other trusted entity can digitally sign nameplate 214. Having a digital signature for nameplate 214 allows content player module 204 to verify that nameplate 214 has not been altered since being digitally signed. This digital signature is typically stored along with nameplate 214 as part of metadata 212. It should also be noted that, although public key encryption is used to generate the digital signature of nameplate 214, content data 210 itself is not encrypted.

Content retrieval module 206 obtains content 208 from content source(s) 108 of FIG. 1 and stores the obtained content in content store 202. Content retrieval module 206 also obtains nameplate 214 from content source(s) 108 and stores the obtained nameplate in content store 202. Content retrieval module 206 can obtain nameplate 214 along with content data 210 as part of content 208. Content retrieval module 206 can also obtain nameplate 214 separately. For example, module 206 may obtain content 208 from another content player, and then obtain a new nameplate 214 having a different authorized user identifier 222 from a different content source.

Content player module 204 manages playback of content 208. Content player module 204 presents a user interface to a user of content player 200, allowing the user to select particular content 208 for playback or to identify to module 204 how module 204 should select content for playback (e.g., according to a playlist, randomly, etc.). Content player module 204 plays back the selected content to the user via one or more output components of, or connected to, player 200, such as a display screen, speakers, and so forth.

Additional functionality can also be included in content player module 204 or content retrieval module 206, or can be implemented in separate components or modules (not shown). For example, content player 200 can optionally include a content source module that allows player 200 to operate as a content source for other content players.

During operation, when playing back content 208, content player module 204 accesses content data 210 and plays back data 210 to the user. Module 214 may also play back portions of metadata 212, providing the user with various information describing content 208.

Content player module 204 presents authorized user identifier 222 to the user while playing back content data 210. In some situations, content 208 may not have a nameplate 214, in which case content player module 204 displays an indication that the source or origin of content 208 is unknown.

Additionally, content player module 204 compares authorized user identifier 222 to a current user of content player 200. A single user or list of users can be associated with content player 200, and content player 200 stores an identifier of this user (or list of users) that can be compared to identifier 222. Alternatively, different users can be logged into player 200 at different times. In such situations, the identifier of the current user logged into player 200 is compared to identifier 222.

If the comparison of authorized user identifier 222 to the current user of player 200 indicates that the current user is not the authorized user, then content player module 204 allows the user to select some action. For example, a "buy" button or other indicia can be displayed to the user. Selection of this button or other indicia causes content player 200 to purchase a license for content 208 so that the current user of player 200 becomes an authorized user of content 208. Other actions could alternatively be selected, as discussed in more detail below.

Figure 3:
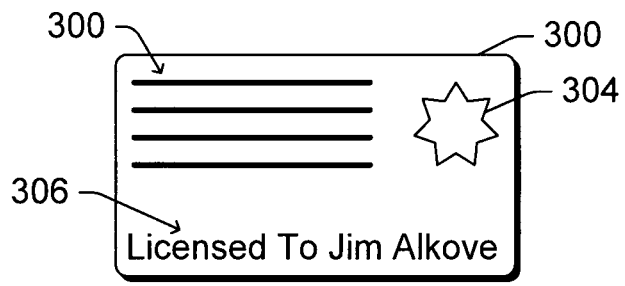
FIG. 3 illustrates an example of information that can be presented to a user of a content player.

FIG. 3 illustrates an example of information that can be presented to a user of a content player. User interface 300 displays text 302 that is various metadata of the content being played back. Text 302 can be, for example, one or more of song title, artist name, album name, recording data, and so forth. Image 304 is a graphical identifier of the content being played back, such as an album cover, artist picture, and so forth. Image 304 is typically obtained from the metadata of the content being played back. If the content being played back includes video content, then user interface 300 also displays the video content.

User interface 300 also displays an authorized user identifier 306 indicating the authorized user of the content being played back. In the illustrated example, the authorized user of the content being played back is Jim Alkove, and identifier 306 indicates that the content being played back is licensed to Jim Alkove. In the example of FIG. 3, Jim Alkove is the current user of the content player, so no additional indicia to allow the user to take additional action is displayed on user interface 300.

Figure 4:
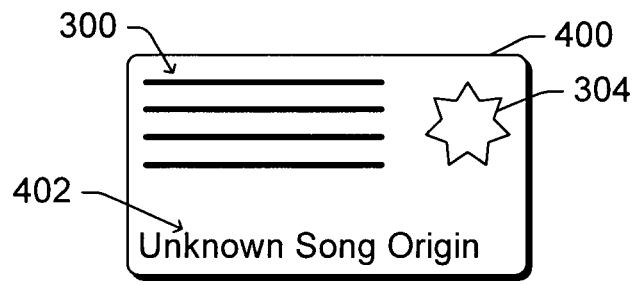
FIG. 4 illustrates another example of information that can be presented to a user of a content player.

FIG. 4 illustrates another example of information that can be presented to a user of a content player. User interface 400 is similar to user interface 300 of FIG. 3, displaying text 302 and image 304. However, user interface 400 displays an indication 402 that there is no nameplate for the content being played back. With no nameplate, it is not known if the current user is an authorized user of the content being played back, and an indication of such is displayed to the user. In this example, the indication is that the origin of the song is unknown.

Figure 5:
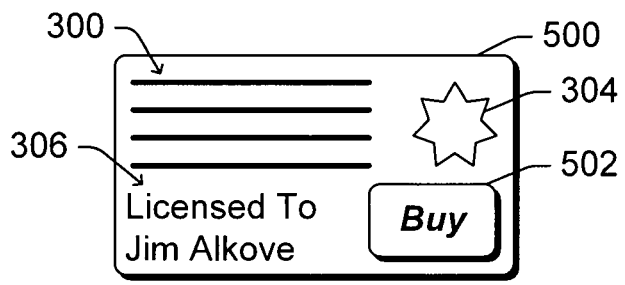
FIG. 5 illustrates another example of information that can be presented to a user of a content player.

FIG. 5 illustrates another example of information that can be presented to a user of a content player. User interface 500 is similar to user interface 300 of FIG. 3, displaying text 302 and image 304. Jim Alkove is again the authorized user of the content being played back, and this authorized user 306 is also displayed in user interface 500. However, in the example of FIG. 5, the user of the content player is not Jim Alkove. Accordingly, additional indicia in the form of button 502 is displayed to the user in order to allow the user to take an additional action. In this example, the additional action is to purchase the content being played back.

If the user were to select button 502, the user would be prompted for payment, or alternatively selection of button 502 may imply a particular form or method of payment. For example, the user may already have credit card information stored with a content source, and selection of button 502 acts as authorization for the user's credit card to be charged for purchase of the content. After purchasing the content, a nameplate associating the current user of the content player with the content being played back is downloaded to the content player. The user interface then changes to user interface 300 of FIG. 3 (except that the name "Jim Alkove" would be replaced with the identifier of the current user of the player), as the current user of the content player is the authorized user of the content.

With respect to the user interfaces of FIGS. 3, 4, and 5, it is to be appreciated that these are only examples. The information displayed in the user interfaces can vary, and can be formatted in any of a variety of manners that differ from those illustrated in FIGS. 3, 4, and 5.

Figure 6:
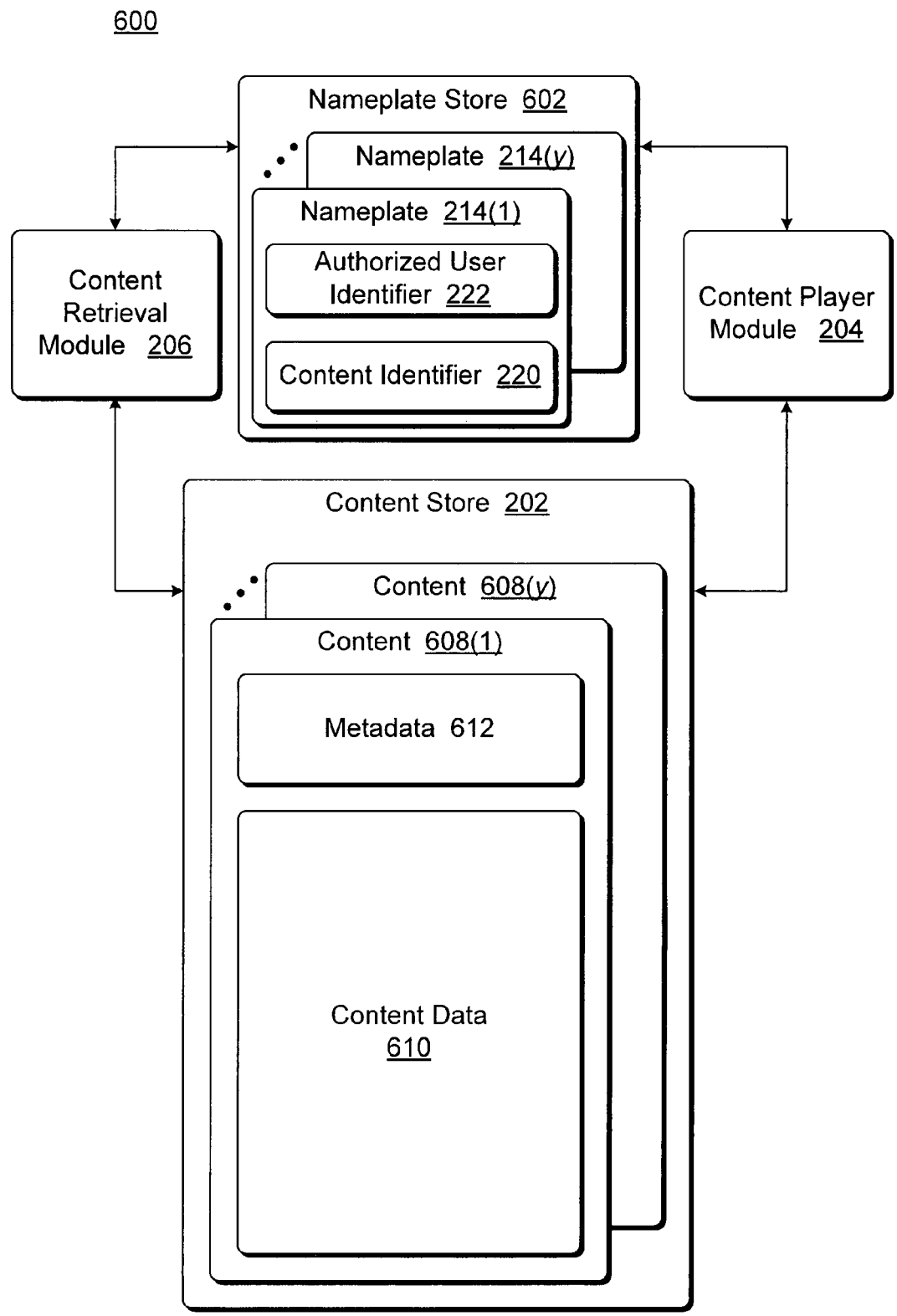
FIG. 6 illustrates another example content player.

FIG. 6 illustrates an example content player 600. Content player 600 can be, for example, content player 102 of FIG. 1. Analogous to content player 200 of FIG. 2, content player 600 includes a content store 202, a content player module 204, and a content retrieval module 206.

Content player 600 differs from content player 200 of FIG. 2, however, in that a separate nameplate store 602 is included in content player 600. Content store 202 stores content 608 (1), . . . , 608(y) having content data 610 and metadata 612, although a nameplate for content 608 is not included in metadata 612. Rather, the nameplate for content 608 is stored as a nameplate 214(1), . . . , 214(y) of nameplate store 602. Nameplate 214 includes a content identifier 220 and an authorized user identifier 222 as discussed above in FIG. 2. A digital signature for nameplate 214 is typically stored along with nameplate 214 in nameplate store 602.

Nameplate store 602 is typically part of content player 600 as illustrated, although nameplate store 602 can alternatively be separate from content player 200. For example, nameplate store 602 can be implemented on a removable storage device (e.g., a removable Flash memory card or removable magnetic disk drive), or can be implemented on a remote storage device (e.g., a network storage device that is accessible to content player 600).

During operation, content player module 204 accesses content store 202 for the selected content to be played back. A nameplate 214 in nameplate store 602 associated with the selected content is obtained from nameplate store 602. The nameplates 214 in nameplate store 602 can be associated with the content 608 in content store 202 in different manners. In one or more embodiments, content identifier 220 is used to associate a nameplate with content. The content identifier 220 can also be included in metadata 612, or alternatively can be readily derived from content 608 (e.g., by generating a hash value using the same hash function as was used to generate identifier 220). Content player module 204 obtains the content identifier from content 608, and then identifies the nameplate 214 in nameplate store 602 having the same content identifier 220.

Figure 7:
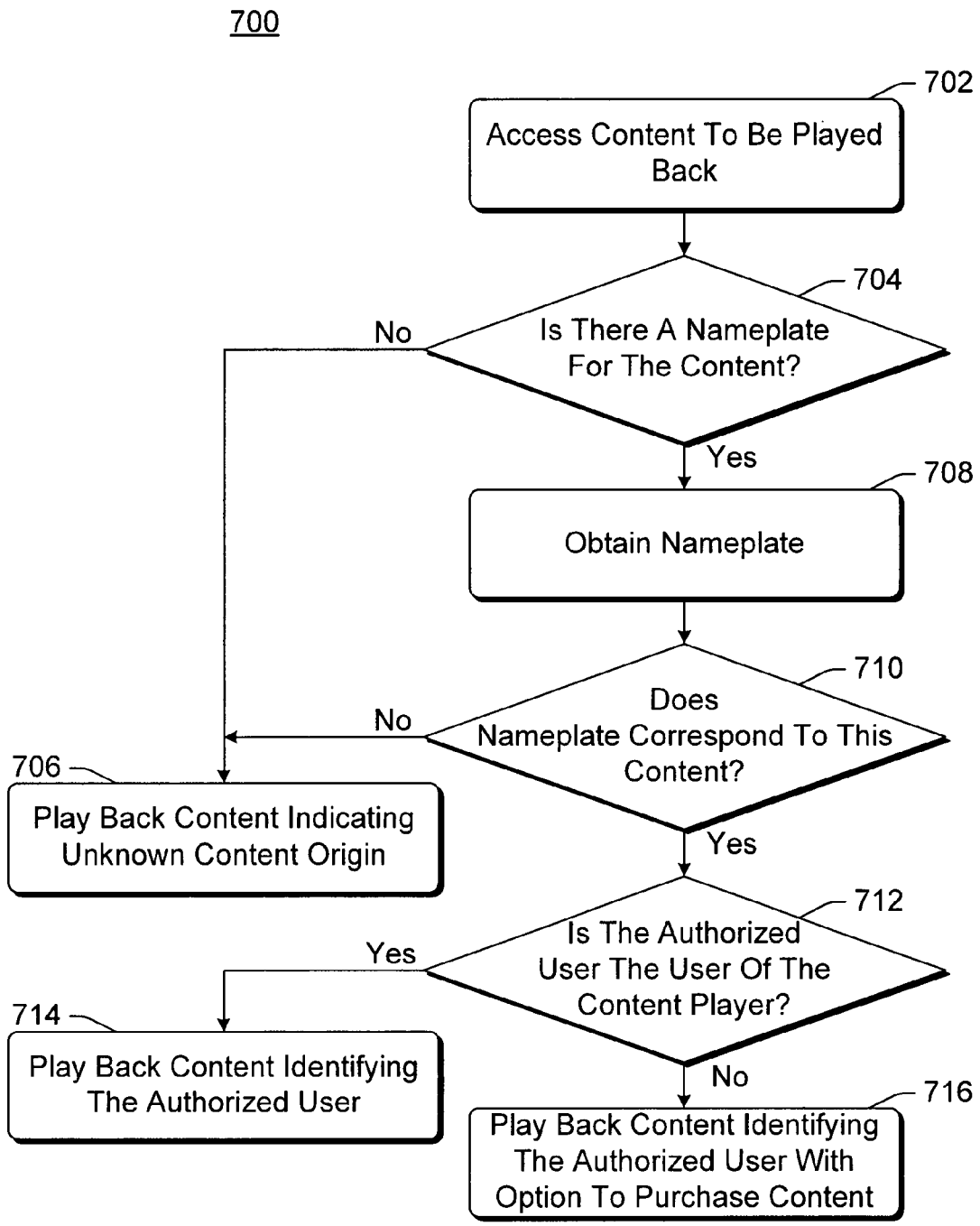
FIG. 7 is a flowchart illustrating an example process for playing back content.

FIG. 7 is a flowchart illustrating an example process 700 for playing back content. Process 700 is carried out by a content player, such as content player 102 of FIG. 1, content player 200 of FIG. 2, or content player 600 of FIG. 6. Process 700 can be implemented in software, firmware, hardware, or combinations thereof. In one or more embodiments, process 700 is carried out by content player module 204 of FIG. 2 or FIG. 6.

Initially, content to be played back is accessed from the content store (act 702). As discussed above, the content to be played back can be selected in any of a variety of different manners. A check is then made as to whether the content to be played back has an associated nameplate (act 704). This associated nameplate can be stored as part of the metadata of the content, or alternatively in a separate nameplate store as discussed above. Not all content need have an associated nameplate.

The presence of an associated nameplate can be determined in different manners. In one or more embodiments, a nameplate presence indicator, such as a digital watermark, is added to the content to identify whether the content has an associated nameplate. A digital watermark refers to data that is embedded in the content in such a manner that its presence can be detected by the content player, but is either not perceptible or not very bothersome to a user of the content player when playing back the content. This digital watermark would typically be embedded in the content prior to its being transferred to the content player. Digital watermarks are well known to those skilled in the art, and thus will not be discussed further except as they pertain to the techniques discussed herein.

Alternatively, the presence of an associated nameplate can be determined in different manners. For example, a digitally signed statement that a nameplate is associated with the content can be included in the metadata for the content, or alternatively in a separate list or record accessible to the content player.

If the nameplate presence indicator indicates that a nameplate should be associated with the content (e.g., the digital watermark indicates that no nameplate is associated with the content), but there is no nameplate present for the content, then the content is played back along with an indication that the content origin is unknown (act 706). However, if there is a nameplate present for the content, then the nameplate is obtained (act 708).

A check is then made as to whether the nameplate corresponds to the content being played back (act 710). This check typically includes two verifications, both of which are made in order to verify that the nameplate does correspond to the content. First, the digital signature of the nameplate is verified. Second, the content identifier in the nameplate is verified as identifying the content being played back. The digital signature can be verified using the public key of the entity that digitally signed the nameplate, as discussed above. The content identifier can be verified as identifying the content being played back in different manners. For example, if the content identifier is a hash value, then the same hash function used to generate the content identifier is applied to the content being played back, and the resultant value is compared to the content identifier to verify that they are the same values. By way of another example, if the content identifier is a unique value assigned by a central authority, then this unique value can be embedded in the content using a digital watermark, and the embedded value can be extracted and compared to the content identifier to verify that they are the same values.

If the nameplate does not correspond to the content being played back, then the content is played back along with an indication that the content origin is unknown (act 706). It should be noted that the same indication is typically returned indicating that the content origin is unknown if there is no nameplate for the content (act 704) or if the nameplate does not correspond to this content (act 710).

Returning to act 710, if the nameplate does correspond to this content then a check is made as to whether the authorized user of the content is the current user of the content player (act 712). This check can be made, as discussed above, by comparing the authorized user identifier in the obtained nameplate to the current user of the content player. If the current user of the content player is the authorized user of the content, then the content is played back along with an identification of the authorized user (act 714). The identification of the authorized user is displayed or otherwise presented to the user as the content is played back (e.g., as illustrated in FIG. 3). In another embodiment the content is played back with no identification of the authorized user.

Returning to act 712, if the current user of the content player is not the authorized user of the content, then the content is played back along with an identification of the authorized user of the content and an option to purchase the content (act 716). This option can be, for example, a button that can be selected by the user to purchase the content. Both the identification of the authorized user and the option are displayed or otherwise presented to the user as the content is played back (e.g., as illustrated in FIG. 5). The user can then select the button, for example, while the content is being played back and become an authorized user of the content during playback of the content.

In process 700, act 716 is illustrated as presenting an option to purchase the content. Alternatively, indicia to allow the user to take different actions other than, or in addition to, purchasing the content could alternatively be presented in act 716. For example, the user could be given the option to delete the content. By way of another example, if the content is a song, then the user could be given the option to purchase the entire album that the song is part of. By way of yet another example, the user could be given an offer to purchase or subscribe to other content that is similar to the content being played back or that was recommended by other people who liked the content being played back. By way of still other examples, the user could be given an offer to subscribe to a service containing the content, or an offer to purchase items related to the content (e.g., concert tickets, movie tickets, shirts or other apparel, and so forth), or a link to navigate to a website for more information about the content.

The particular indicia given to the user in act 716 can be a configuration setting of the content player, or alternatively the content player could be informed of the particular indicia to give in other manners. For example, different content sources 108 of FIG. 1 could prefer different indicia, and these content sources could inform the content player of the indicia that should be used for content that was obtained from those sources. By way of another example, different content could have associated with it different indicia, and the content player could use the particular indicia associated with particular content when that particular content is played back. Particular indicia can be associated with particular content in different manners, such as being included in the nameplate associated with the content, being included in another portion of the metadata for the content, being embedded in the content data using digital watermarking, having a separate record or list that is accessible to the content player, and so forth.

It should be noted that, although the option given in act 716 and the example illustrated in FIG. 5 discuss displaying indicia, the option to take some action (such as purchase the content) can be presented to the user in other manners. For example, the option can be presented audibly to the user.

It should also be noted that, referring to act 712, the authorized user of the content being played back may not be the current user of the content player for any of a variety of reasons. Oftentimes, the current user of the content player will obtain a copy of content from a friend or elsewhere on the Internet, and is not yet an authorized user of the content. The authorized user that is identified during playback of the content in act 716 is the user identified in the nameplate associated with the content being played back. Additionally, the same content can be licensed to different users and multiple copies of such content would include nameplates identifying different authorized users. The particular authorized user that is identified in act 716 is the authorized user identified in the nameplate associated with the particular copy of the content being played back.

In act 716, an identification of the authorized user is presented to the user of the content player. Alternatively, rather than identifying the authorized user, a generic statement that the content being played back is an unauthorized copy of the content could be displayed. Thus, a particular user would not be identified in act 716.

As can be seen from process 700, the content can be played back regardless of whether a nameplate is present for the content, regardless of whether the nameplate present corresponds to the content, and regardless of whether the current user of the content player is an authorized user for the content. Additional information that is presented to the user can vary based on which of these conditions is satisfied, but the playback of the content itself is not altered.

In one or more alternate embodiments, more restrictive conditions could be imposed. For example, act 716 could be implemented to prevent the content from being played back, or allow the content to be played back only a particular number of times, if the current user of the content player is not the authorized user of the content. By way of another example, act 706 could be implemented to prevent the content from being played back if the nameplate does not correspond to the content, or to require that a nameplate be obtained by the content player before playback of the content can occur.

Figure 8:
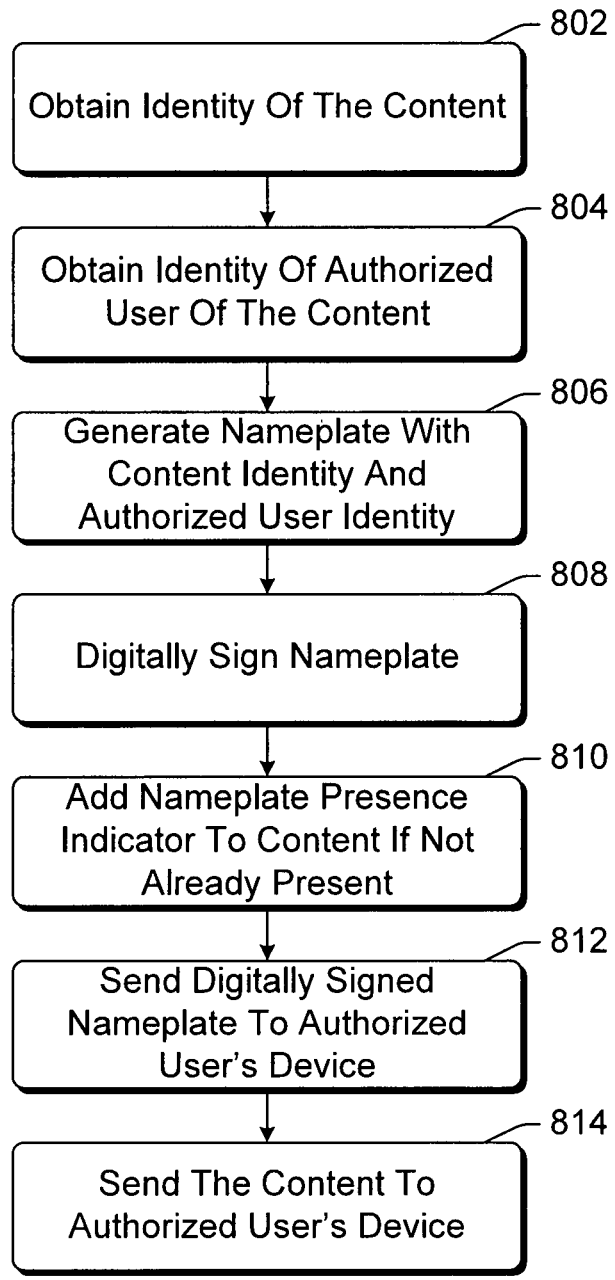
FIG. 8 is a flowchart illustrating an example process for generating a nameplate.

FIG. 8 is a flowchart illustrating an example process 800 for generating a nameplate. Process 800 is typically carried out by a content source, such as a source 108 of FIG. 1, although may alternatively be carried out by other devices. Process 800 can be implemented in software, firmware, hardware, or combinations thereof.

Initially, an identity of the content for which the nameplate is to be associated is obtained (act 802). As discussed above, this identity can be a hash value obtained in act 802 by applying a hash function to the content, although alternatively the identity can be obtained in different manners. An identity of the authorized user of the content is also obtained (act 804). This identity can be obtained in different manners, such as being received from a content player that has logged into the device or service implementing process 800, accessing a local registry of user identities of users logged into the device or service implementing process 800, and so forth.

The nameplate with the identity of the content obtained in act 802 and the identity of the authorized user obtained in act 804 is then generated (act 806) and digitally signed (act 808). Additionally, a nameplate presence indicator is added to the content if not already present (act 810). The nameplate presence indicator indicates the presence of the nameplate for the content, and can be added to the content in different manners (e.g., as a digital watermark as discussed above). The nameplate presence indicator may have already been added to the content, such as previously by the content source or by the content distributor from which the content source obtained the content. If the nameplate presence indicator has already been added to the content, it need not be added again in act 810.

The generated nameplate, along with the digital signature generated in act 808, is sent to the authorized user's device (act 812). To obtain the nameplate, the user typically logs into the content source using his or her content player, and this content player is the device to which the nameplate is returned. The nameplate can be returned as part of the metadata of the content, or alternatively separately from the content.

The content associated with the generated nameplate is also optionally sent to the authorized user's device (act 814). The user can obtain a nameplate for content in different situations. In certain situations, the user does not have the content or the nameplate on his or her device, in which case content retrieval module 206 of FIG. 2 or FIG. 6 requests both the content and the nameplate from the content source. The nameplate and content can optionally be sent together (e.g., the nameplate can be included in the metadata of the content). In other situations, the user already has the content on his or her device. This could occur, for example, if the user copied the content from a friend's MP3 player, from another source on the Internet, and so forth. In such situations, the user already has the content on his or her device, and thus content retrieval module 206 only requests the nameplate from the content source.

Referring to FIGS. 7 and 8, if the authorized user of the content being played back is not the same user as is currently using the content player, the user can become an authorized user (e.g., buy purchasing the content). In such situations, content retrieval module 206 obtains a nameplate that is associated with the content currently being played back and that identifies the current user of the device. Module 206 then stores this nameplate in a separate nameplate store (e.g., store 602 of FIG. 6) or in the metadata for the content already on the device (e.g., in metadata 212 of FIG. 2). Content player module 204 then plays back the content identifying the current user of the content player as an authorized user of the content, and no longer presents the option to buy the content. Thus, the user need not re-obtain the content from the content source and the content need not be re-encoded in any manner to associate the content with the newly authorized user. Rather, the received nameplate suffices to associate the content with the newly authorized user.

Thus, it can be seen that the techniques discussed herein provide rights enforcement of unencrypted content. In traditional encryption-based systems, the playback of content defaults to being restricted—the user is restricted from using the content until they can prove that they are permitted to use the content. In contrast, the techniques discussed herein default to a permissive state, where playback of the content is permitted by default. Nonetheless, a level of rights enforcement is still provided by the presentation of the identity of the authorized user and the option for other users to purchase the content (or indicia of other actions to be taken).

Figure 9:
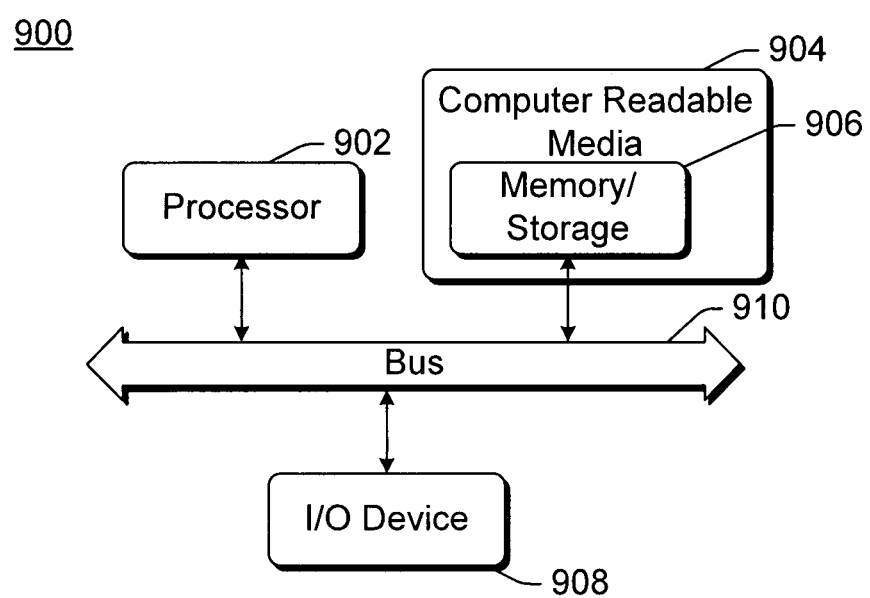
FIG. 9 illustrates an example computing device that can be configured to implement the rights enforcement of unencrypted content.

FIG. 9 illustrates an example computing device 900 that can be configured to implement the rights enforcement of unencrypted content in accordance with one or more embodiments. Computing device 900 can be, for example, content player 102 or a content source 108 of FIG. 1, content player 200 of FIG. 2, or content player 600 of FIG. 6.

Computing device 900 includes one or more processors or processing units 902, one or more computer readable media 904 which can include one or more memory and/or storage components 906, one or more input/output (I/O) devices 908, and a bus 910 that allows the various components and devices to communicate with one another. Computer readable media 904 and/or I/O device(s) 908 can be included as part of, or alternatively may be coupled to, computing device 900. Bus 910 represents one or more of any of several types of bus structures, including a memory bus or memory controller, a peripheral bus, an accelerated graphics port, and a processor or local bus using any of a variety of bus architectures. Bus 910 can include wired and/or wireless buses.

Memory/storage component 906 represents one or more computer storage media. Component 906 can include volatile media (such as random access memory (RAM)) and/or non-volatile media (such as read only memory (ROM), Flash memory, optical disks, magnetic disks, and so forth). Component 906 can include fixed media (e.g., RAM, ROM, a fixed hard drive, etc.) as well as removable media (e.g., a Flash memory drive, a removable hard drive, an optical disk, and so forth).

One or more input/output devices 908 allow a user to enter commands and information to computing device 900, and also allows information to be presented to the user and/or other components or devices. Examples of input devices include a keyboard, a cursor control device (e.g., a mouse), a microphone, a scanner, and so forth. Examples of output devices include a display device (e.g., a screen, a monitor, a projector, etc.), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, by a server, a request for a nameplate associated with unencrypted digital content on a device, the unencrypted digital content comprising digital content that can be played back regardless of whether the nameplate is present for the digital content, the digital content that can be played back being configured to be played back with an indication that an origin of the digital content is unknown when the nameplate is not present for the digital content;
   generating, by the server, the nameplate associated with the unencrypted digital content;
   generating an identifier of the unencrypted digital content by applying a hash function to the unencrypted digital content, the nameplate including the identifier of the unencrypted digital content and an identifier of an authorized user of the unencrypted digital content, wherein the identifier of the authorized user comprises an identifier of a domain that includes a device of the authorized user;
   in an event that a nameplate presence indicator is not present for the unencrypted digital content, adding the nameplate presence indicator to the unencrypted digital content to indicate that the nameplate should be associated with the unencrypted digital content;
   digitally signing the nameplate;
   sending, by the server, the nameplate to the device of the authorized user for rights enforcement of the unencrypted digital content on the device.

2. A method as recited in claim 1, further comprising:
   performing both the generating and the sending in response to a request from the device to purchase the unencrypted digital content, the request being received from a device having a current user that is not the authorized user of the unencrypted digital content.

3. A method as recited in claim 1, further comprising:
   including the nameplate in metadata of the unencrypted digital content.

4. A method as recited in claim 1, further comprising:
   sending the nameplate to the device as part of the unencrypted digital content.

5. One or more hardware computer readable storage memories comprising computer readable instructions which, when executed, implement a method comprising:
   receiving, by a server, a request for a nameplate associated with unencrypted digital content on a device, the unencrypted digital content comprising digital content that can be played back regardless of whether the nameplate is present for the digital content, the digital content that can be played back being configured to be played back with an indication that an origin of the digital content is unknown when the nameplate is not present for the digital content;
   generating, by the server, the nameplate associated with the unencrypted digital content;
   generating an identifier of the unencrypted digital content by applying a hash function to the unencrypted digital content, the nameplate including the identifier of the unencrypted digital content and an identifier of an authorized user of the unencrypted digital content, wherein the identifier of the authorized user comprises an identifier of a domain that includes a device of the authorized user;
   in an event that a nameplate presence indicator is not present for the unencrypted digital content, adding the nameplate presence indicator to the unencrypted digital content to indicate that the nameplate should be associated with the unencrypted digital content;
   digitally signing the nameplate; and
   sending, by the server, the nameplate to the device of the authorized user for rights enforcement of the unencrypted digital content on the device.

6. The one or more hardware computer readable storage memories of claim 5, further comprising:
performing both the generating and the sending in response to a request from the device to purchase the unencrypted digital content, the request being received from a device having a current user that is not the authorized user of the unencrypted digital content.

7. The one or more hardware computer readable storage memories of claim 5, further comprising:
including the nameplate in metadata of the unencrypted digital content.

8. The one or more hardware computer readable storage memories of claim 5, further comprising:
sending the nameplate to the device as part of the unencrypted digital content.

9. A computing device comprising:
one or more hardware processors;
one or more computer readable storage memories comprising computer readable instructions which, when executed by the one or more processors, implement a method comprising:
receiving, by a server, a request for a nameplate associated with unencrypted digital content on a device, the unencrypted digital content comprising digital content that can be played back regardless of whether the nameplate is present for the digital content, the digital content that can be played back being configured to be played back with an indication that an origin of the digital content is unknown when the nameplate is not present for the digital content;
generating, by the server, the nameplate associated with the unencrypted digital content;
generating an identifier of the unencrypted digital content by applying a hash function to the unencrypted digital content, the nameplate including the identifier of the unencrypted digital content and an identifier of an authorized user of the unencrypted digital content, wherein the identifier of the authorized user comprises an identifier of a domain that includes a device of the authorized user;
in an event that a nameplate presence indicator is not present for the unencrypted digital content, adding the nameplate presence indicator to the unencrypted digital content to indicate that the nameplate should be associated with the unencrypted digital content;
digitally signing the nameplate; and
sending, by the server, the nameplate to the device of the authorized user for rights enforcement of the unencrypted digital content on the device.

10. The computing device of claim 9, further comprising:
performing both the generating and the sending in response to a request from the device to purchase the unencrypted digital content, the request being received from a device having a current user that is not the authorized user of the unencrypted digital content.

11. The computing device of claim 9, further comprising:
including the nameplate in metadata of the unencrypted digital content.

12. The computing device of claim 9, further comprising:
sending the nameplate to the device as part of the unencrypted digital content.

* * * * *